Jan. 4, 1966    E. LIESER    3,227,056
BATTERY TESTING DEVICE
Filed July 1, 1963
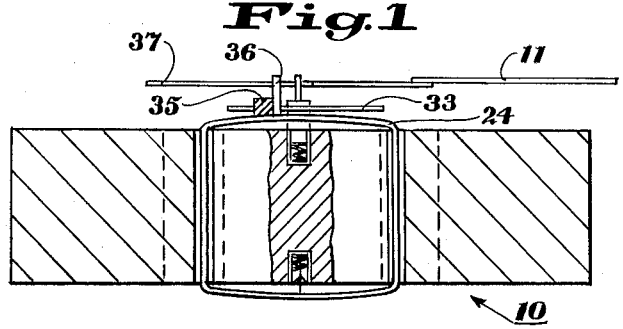
Fig.1
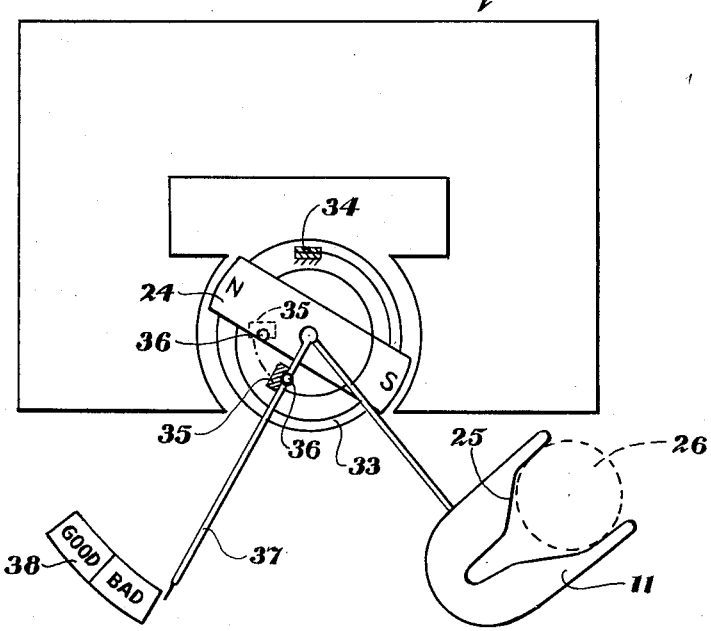
Fig.2
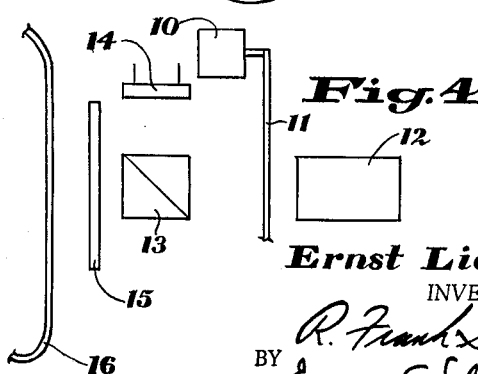
Fig.3
Fig.4
Ernst Lieser
INVENTOR.
BY R. Frank Smith
Eugene S. Stephens
ATTORNEYS United States Patent Office 3,227,056
Patented Jan. 4, 1966

3,227,056
BATTERY TESTING DEVICE
Ernst Lieser, Stuttgart, Germany, assignor to Eastman Kodak Company, Rochester, N.Y., a corporation of New Jersey
Filed July 1, 1963, Ser. No. 291,757
Claims priority, application Germany, July 7, 1962, K 47,172
7 Claims. (Cl. 95—10)

This invention relates to a device for measuring the electric potential of a battery or other source of electric potential, and more particularly to a structure for adapting a normally springless electric measuring instrument for making such measurement.

Electric measuring instruments including null measuring instruments are known that have a movable member uninfluenced by springs or other mechanical directive forces and positionable throughout an operating range solely by magnetic forces that are electrically derived from the quantity measured by means of a measuring system. Because the movable member of such an instrument lacks springs for resisting deflection, it is unsuited for other types of electrical measurement. Such an instrument assumes a state of equilibrium in the absence of a signal, and application of even a small difference of potential drives its movable member as far as possible in one direction.

It is an object of this invention to adapt such a measuring instrument for measuring or testing the potential of a battery.

Another object of the invention is to indicate the potential difference across a camera battery by means of a null measuring instrument having a member uninfluenced by springs and normally functioning in the camera's exposure control system.

Another object of the invention is to display in a camera viewfinder an indiction of a test of a camera battery.

These and other objects and advantages will be apparent to those skilled in the art by the description which follows. Reference is now made to the accompanying drawings wherein like reference numerals and letters designate like parts and wherein:

FIG. 1 shows a partially sectioned side view of an instrument according to the invention;

FIG. 2 shows a front view of an instrument according to the invention;

FIG. 3 shows a diagram of an electric circuit useable with the invention; and

FIG. 4 shows a schematic diagram of an embodiment of the invention within a camera.

One use of a measuring instrument of the type having a movable member not subject to springs or any mechanical directive forces is in a camera exposure control system. My co-pending application Serial No. 226,304 describes in detail such a system, and a similar exposure control mechanism is shown in FIGS. 3 and 4.

As shown in FIG. 4, an electric null measuring instrument 10 has a movable member provided with a diaphragm vane 11 arranged for intersecting the camera light path along the axis of a taking lens 12. A beam splitter 13 directs a portion of the light onto photocell 14 and permits another portion of the light to pass through shutter 15 and onto a photosensitive surface such as film strip 16. Modification of the light by diaphragm vane 11 thus regulates both the light reaching film strip 16 and cell 14.

As shown in FIG. 3, a photocell 14, illustrated as a photoconductive cell, is arranged in one arm of a Wheatstone bridge, and variable resistances 17–19 are arranged for adjusting the bridge so that it will balance in response to a predetermined signal from cell 14. Instrument 10 is connected across the balance terminals of the bridge for responding to a null by assuming a state of equilibrium. Switch arms 20 and 21, which are normally in the illustrated position, allow energization of the bridge by batteries 22 and 23. Leads 27, 28 and 29 are for motors for film advance and zoom lens drives.

The movable member of instrument 10, including diaphragm vane 11, assumes a position within its normal operating range which regulates illumination of cell 14 so as to balance the bridge for producing an electric null and thus eliminating current flow through instrument 10. Should diaphragm vane 11 move in either direction from such a null producing position, it would vary the light falling on cell 14. This would unbalance the bridge and produce an appropriate current through instrument 10 for driving its movable member back toward a position which balances the bridge and produces an electric null. Thus, the movable member and diaphragm vane 11 of instrument 10 are positioned as a function of scene light without the influence of any mechanical directive force.

FIGS. 1 and 2 show the details of instrument 10 which has a coil 24 mounted for rotation in a magnetic field. Diaphragm vane 11, having shaped opening 25, is fastened to movable coil 24 and arranged for moving over a fixed maximum aperture 26 of the camera's taking lens for effectively reducing the size of such aperture to regulate the light admitted to the film 16 and photocell 14 in the camera (FIG. 4). Counterclockwise rotation of coil 24 and diaphragm vane 11 from the position illustrated in FIG. 2 constitutes the normal operating range of instrument 10. Throughout such a range, coil 24 is uninfluenced by any mechanical directive forces, and is adapted to assume a state of equilibrium in response to the above-described electric null produced by regulation of light by the diaphragm vane 11.

In FIG. 3 is shown an arrangement for testing a battery such as camera batteries 22 and 23 by means of instrument 10. For a battery test, coupled switch arms 20 and 21 are moved from their illustrated positions into engagement with contacts 30 and 31, respectively. This serves to connect batteries 22 and 23 in series with instrument 10 and resistor 32. Such application of the difference of potential of batteries 22 and 23 to instrument 10 tends to move coil 24 as far as possible in one rotational direction. The coil position illustrated in FIG. 2 represents the clockwise limit of the normal operating range of coil 24, diaphragm vane 11 having fully uncovered aperture 26. The polarity of batteries 22 and 23 is arranged to cause further clockwise movement of coil 24 beyond the end of its normal operating range.

A helical spring 33 fixed to the camera body at mounting block 34 is arranged for resisting clockwise deflection of coil 24 beyond its normal operating range. In the position illustrated in FIG. 2, a stop 35 fastened to the free end of spring 33 is engaged by a pin 36 fastened to a pointer 37 and movable with coil 24 so that clockwise rotation of coil 24 beyond such position and toward the broken line position of pin 36 is resisted by spring 33. Counterclockwise rotation of coil 24 from the position illustrated in FIG. 2 is not affected by spring 33 because stop 35 is shown at the limit of its counterclockwise movement and pin 36 disengages from stop 35 for any counterclockwise deflection. During the spring-resisted clockwise rotation of coil 24 beyond its normal operating range, pointer 37 moves over scale 38 which bears indicia of battery potential, for indicating the results of a battery test. Scale 38 may be made visible in a camera viewfinder (not shown) by well-known means.

In operation, batteries 22 and 23 normally energize the Wheatstone bridge shown in FIG. 3, and instrument 10 with its movable diaphragm vane 11 functions to adjust the light falling on cell 14 so as to balance the bridge and produce an electric null in response to which the movable member of instrument 10 assumes a state of equilibrium within its normal operating range throughout which it is uninfluenced by any mechanical directive force. For testing batteries, switch arms 20 and 21 are moved into respective engagement with contacts 30 and 31 for directly energizing instrument 10 by batteries 22 and 23. This causes movement of coil 24 clockwise from the position shown in FIG. 2, beyond its normal operating range, whereby pin 36 engages spring 33 for resisting deflection of coil 24. As coil 24 deflects clockwise against the force of spring 33, pointer 37 transverses scale 38 for indicating battery potential.

The invention has been described in detail with particular reference to preferred embodiments thereof, but it will be understood that variations and modifications can be effected within the spirit and scope of the invention as described hereinabove and as defined in the appended claims.

I claim:

1. A device for measuring the electric potential of a source of electric potential, comprising:
    (a) an electric measuring instrument having a means movable in opposite directions from an intermediate position within a first operating range, means applying to said instrument electric currents proportional to a variable, said electric currents being applied with opposite polarities respectively to correspondingly move said movable means in said opposite directions from said intermediate position within said first range;
    (b) means for connecting said source in electric circuit with said instrument for deflecting said movable means into a second range beyond one end of said first range; and
    (c) resilient means ineffective to oppose movement of said movable means whenever said movable means is in said first range and operable for differentially resisting deflection of said movable means only when said movable means is within said second range, to position said movable means within said second range as a function of the potential of said source.

2. A device for measuring the electric potential of a source of electric potential, comprising:
    (a) an electric measuring instrument normally operable for measuring another variable and having a member freely movable in opposite directions from an intermediate position within a first operating range in response solely to electric currents of corresponding relative opposite polarities;
    (b) means for connecting said source in electric circuit with said instrument for deflecting said member into a second range beyond one end of said first range;
    (c) resilient means ineffective to oppose movement of said member whenever said member is in said first range and rendered operable only upon deflection of said member into said second range for differentially resisting such last mentioned deflection, whereby said member is positionable within said second range as a function of the potential of said source; and
    (d) means for indicating the position of said member in said second range.

3. In a photographic camera having a source of electric potential, means for measuring the potential of said source, comprising:
    (a) an exposure control device including a photo-responsive element illuminatable by scene light and a null measuring instrument in circuit with said photo-responsive element, said circuit so connecting said instrument and said element that current will flow in either of opposite directions through said instrument depending upon the output of said element, said null measuring instrument including a movable member adapted to control illumination and thereby the output of said photoresponsive element said member being arranged to be freely movable in opposite directions within a first operating range solely in accordance with the direction of said current flow through said meter, whereby said member is positionable within said range as a function of scene light;
    (b) means for connecting said source in electrical circuit with said instrument for deflecting said member into a second range beyond one end of said first range;
    (c) resilient means ineffective to influence movement of said member whenever said member is in said first range and operable only upon deflection of said member into said second range for differentially resisting such last mentioned deflection, whereby said member is positionable within said second range as a function of the potential of said source; and
    (d) means for indicating the position of said member in said second range.

4. The device of claim 3 wherein said indicating means comprises a pointer and scale one of which is movable with said movable member.

5. The device of claim 4 wherein said camera has a viewfinder in which said pointer and scale are visible.

6. A device for measuring the electric potential of a source of electric potential comprising:
    (a) a null measuring system including an instrument having a movable means uninfluenced by mechanical directive force within a first operating range and adapted to assume an equilibrium position within said range solely as a function of the quantity measured;
    (b) means for connecting said source in electric circuit with said instrument for deflecting said movable means into a second range beyond one end of said first range;
    (c) resilient means ineffective to influence movement of said member whenever said member is in said first range and rendered operable only upon deflection of said member into said second range for differentially resisting such last mentioned deflection, whereby said member is positionable within said second range as a function of the potential of said source; and
    (d) means for indicating the position of said member in said second range.

7. A camera battery testing device comprising:
    (a) an electric measuring instrument having a coil means movable within a magnetic field throughout a first operating range, said coil means being adapted to rest in equilibrium in any position within said first range in response to lack of electric current in said coil and being adapted to deflect in opposite directions throughout said first range solely in response to electric currents in corresponding relatively opposite directions in said coil;
    (b) switch means for electrically connecting said battery in series with said coil for deflecting the latter into a second range beyond one end of said first range;

(c) a spring means ineffective to oppose movement of said coil whenever said coil is in said first range and rendered operable only upon deflection of said coil into said second range for differentially resisting such second range deflection of said coil, for positioning said coil within said second range as a function of the potential of said source;

(d) a pointer movable with said coil; and (e) a scale bearing battery potential indicia and co-operable with said pointer during said second range deflection for indicating battery potential.

References Cited by the Examiner

UNITED STATES PATENTS 2,597,188  5/1952  Rozett _____ 324—155 X

FOREIGN PATENTS 1,235,184  5/1960  France.
1,056,470  4/1959  Germany.

NORTON ANSHER, *Primary Examiner*.